United States Patent
Kawabata et al.

(10) Patent No.: US 12,360,986 B2
(45) Date of Patent: Jul. 15, 2025

(54) DATABASE LANGUAGE RE-ISSUE DEVICE

(71) Applicants: Mitsubishi Electric Corporation, Tokyo (JP); Mitsubishi Electric Building Solutions Corporation, Tokyo (JP)

(72) Inventors: Rika Kawabata, Tokyo (JP); Koji Sakata, Tokyo (JP); Satoshi Shiga, Tokyo (JP)

(73) Assignees: MITSUBISHI ELECTRIC CORPORATION, Tokyo (JP); MITSUBISHI ELECTRIC BUILDING SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 17/607,027

(22) PCT Filed: Jun. 5, 2019

(86) PCT No.: PCT/JP2019/022352
§ 371 (c)(1),
(2) Date: Oct. 28, 2021

(87) PCT Pub. No.: WO2020/245943
PCT Pub. Date: Dec. 10, 2020

(65) Prior Publication Data
US 2022/0229835 A1 Jul. 21, 2022

(51) Int. Cl.
*G06F 16/242* (2019.01)
*G06F 16/2452* (2019.01)
*G06F 16/2455* (2019.01)

(52) U.S. Cl.
CPC ...... *G06F 16/2423* (2019.01); *G06F 16/2452* (2019.01); *G06F 16/24564* (2019.01)

(58) Field of Classification Search
CPC .......... G06F 16/2423; G06F 16/2452; G06F 16/24564; G06F 16/2455; G06F 16/248
See application file for complete search history.

(56) References Cited

U.S. PATENT DOCUMENTS

| | | | |
|---|---|---|---|
| 2002/0095405 A1 | 7/2002 | Fujiwara | |
| 2018/0150510 A1 | 5/2018 | Tanaka et al. | |
| 2020/0233721 A1* | 7/2020 | Mathur | G06F 3/067 |

FOREIGN PATENT DOCUMENTS

| | | |
|---|---|---|
| CN | 107533550 A | 1/2018 |
| JP | 9-231116 A | 9/1997 |
| JP | 6366843 B2 | 8/2018 |

OTHER PUBLICATIONS

Sasaki, The Elevator Monitoring System with JAVA, pp. 140-147 (Year: 2000).*

(Continued)

*Primary Examiner* — Albert M Phillips, III
(74) *Attorney, Agent, or Firm* — XSENSUS LLP

(57) ABSTRACT

There is provided a database language re-issue device capable of appropriately obtaining data from a database. The database language re-issue device extracts a data obtainment target, a data request period and a data item from a query issued by an application, obtains information about a collection program of the extracted data obtainment target for the data request period, obtains definition information of a table for the obtained collection program, changes the data item in the query to a data item for the data request period based on the obtained definition information of the table, executes a query to a database based on the changed data item, and returns obtained data from the database to the application, the data being based on the executed query.

13 Claims, 14 Drawing Sheets

(56) References Cited

OTHER PUBLICATIONS

Indian Office Action issued Apr. 28, 2022, in corresponding Indian Patent Application No. 202147051267.
International Search Report and Written Opinion mailed on Aug. 13, 2019, received for PCT Application PCT/JP2019/022352, Filed on Jun. 5, 2019, 6 pages including English Translation.
Office Action mailed Nov. 1, 2023, in Korean Patent Application No. 10-2021-7038881, 13 pages.
Luo Si et al., A Semisupervised Learning Method to Merge Search Engine Results, AMC Transactions on Information System, vol. 21, No. 4, pp. 457-491,Oct. 2003.
Clare Churcher, Beginning SQL Queries: From Novice to Professional, Apress, Apr. 2008.
Office Action issued on Nov. 29, 2024, in corresponding Chinese patent Application No. 201980096872.3, 16 pages.
Office Action issued on May 29, 2025, in corresponding Chinese patent Application No. 201980096872.3, 10 pages.

\* cited by examiner

Fig. 2

| BULDING | ELEVATOR | COLLECTION PROGRAM | START | END |
|---|---|---|---|---|
| 003 | 1 | 8 | 2017/2/3 | 2017/8/23 |
| 003 | 1 | 9 | 2017/8/24 | 2019/3/31 |
| 004 | 2 | 7 | 2016/7/14 | 2019/3/31 |
| 023 | 1 | 8 | 2017/2/10 | 2018/5/10 |

Fig. 3

| INITIAL TABLE NAME | INITIAL COLUMN NAME | COLLECTION PROGRAM | TABLE NAME | COLUMN NAME |
|---|---|---|---|---|
| TABLE01 | AA | 8 | TABLE01_8 | AA2 |
| TABLE01 | BB | 8 | TABLE01_8 | BB |
| TABLE01 | CC | 8 | TABLE01_8 | NULL |
| TABLE01 | DD | 8 | TABLE01_8 | DD |

Fig. 9

```
SELECT AA, BB, CC FROM TABLE01
WHERE BUILDING='003' AND ELEVATOR='1'
 AND REQUEST_PERIOD>='2017/7/1' AND REQUEST_PERIOD=<2017/10/1;
```

| BUILDING | ELEVATOR | COLLECTION PROGRAM | START | END |
|---|---|---|---|---|
| 003 | 1 | 8 | 2017/2/3 | 2017/8/23 |
| 003 | 1 | 9 | 2017/8/24 | 2019/3/31 |

Fig. 10

```
SELECT AA, BB, CC FROM TABLE01
WHERE (BUILDING='003' AND ELEVATOR='1'
    OR BUILDING='015' AND ELEVATOR='2')
 AND REQUEST_PERIOD>='2017/8/1';
```

| BUILDING | ELEVATOR | COLLECTION PROGRAM | START | END |
|---|---|---|---|---|
| 003 | 1 | 8 | 2017/2/3 | 2017/8/23 |
| 003 | 1 | 9 | 2017/8/24 | 2019/3/31 |
| 015 | 2 | 7 | 2017/5/10 | 2019/3/31 |

DATABASE LANGUAGE RE-ISSUE DEVICE

CROSS-REFERENCE TO RELATED APPLICATION

The present application is based on PCT filing PCT/JP2019/022352, filed Jun. 5, 2019, the entire contents of which are incorporated herein by reference.

FIELD

This invention relates to a database language re-issue device.

BACKGROUND

PTL 1 discloses a database language re-issue device. According to the database language re-issue device, even when a table name or the like of a database is changed, it is possible to use an existing database language issue device.

CITATION LIST

Patent Literature

[PTL 1] JP H9-231116 A

SUMMARY

Technical Problem

In the database language re-issue device according to PTL 1, however, it is necessary that a definition of a database is made for each system. Therefore, if a different database definition exists in a data obtainment target or the like, it is not possible to appropriately obtain data from the database.

This invention has been made to solve the above problem. An object of this invention is to provide a database language re-issue device capable of appropriately obtaining data from a database.

Solution to Problem

A database language re-issue device according to this invention includes: an obtainment target information extracting unit extracting a data obtainment target, a data request period and a data item from a query issued by an application; an update information obtaining unit obtaining information about a collection program of the data obtainment target for the data request period, extracted by the obtainment target information extracting unit; a table definition information obtaining unit obtaining definition information of a table that is a processing target of the collection program obtained by the update information obtaining unit; a database language changing unit changing the data item in the query to a data item for the data request period based on the definition information of the table obtained by the table definition information obtaining unit; a database querying unit executing a database query based on the data item changed by the database language changing unit; and a database query result merging unit returning obtained data from a database to the application, the data being based on the query executed by the database querying unit.

Advantageous Effects of Invention

According to this invention, a database language re-issue device executes a database query corresponding to a data obtainment target, a data request period and a data item. Therefore, it is possible to appropriately obtain data from a database.

BRIEF DESCRIPTION OF DRAWINGS

FIG. 2 is a diagram showing an example of a data collection program update history management table used by the database language re-issue device in the first embodiment.

FIG. 3 is a diagram showing an example of a table definition information change history management table used by the database language re-issue device in the first embodiment.

FIG. 9 is a diagram showing a first example of a table definition information change history management table used by the database language re-issue device in the third embodiment.

FIG. 10 is a diagram showing a second example of the table definition information change history management table used by the database language re-issue device in the third embodiment.

DESCRIPTION OF EMBODIMENTS

Embodiments for implementing this invention will be described according to accompanying drawings. In each figure, the same or corresponding parts are given the same reference sign. Duplicated description of the parts will be appropriately simplified or omitted.

First Embodiment

Figure 1:
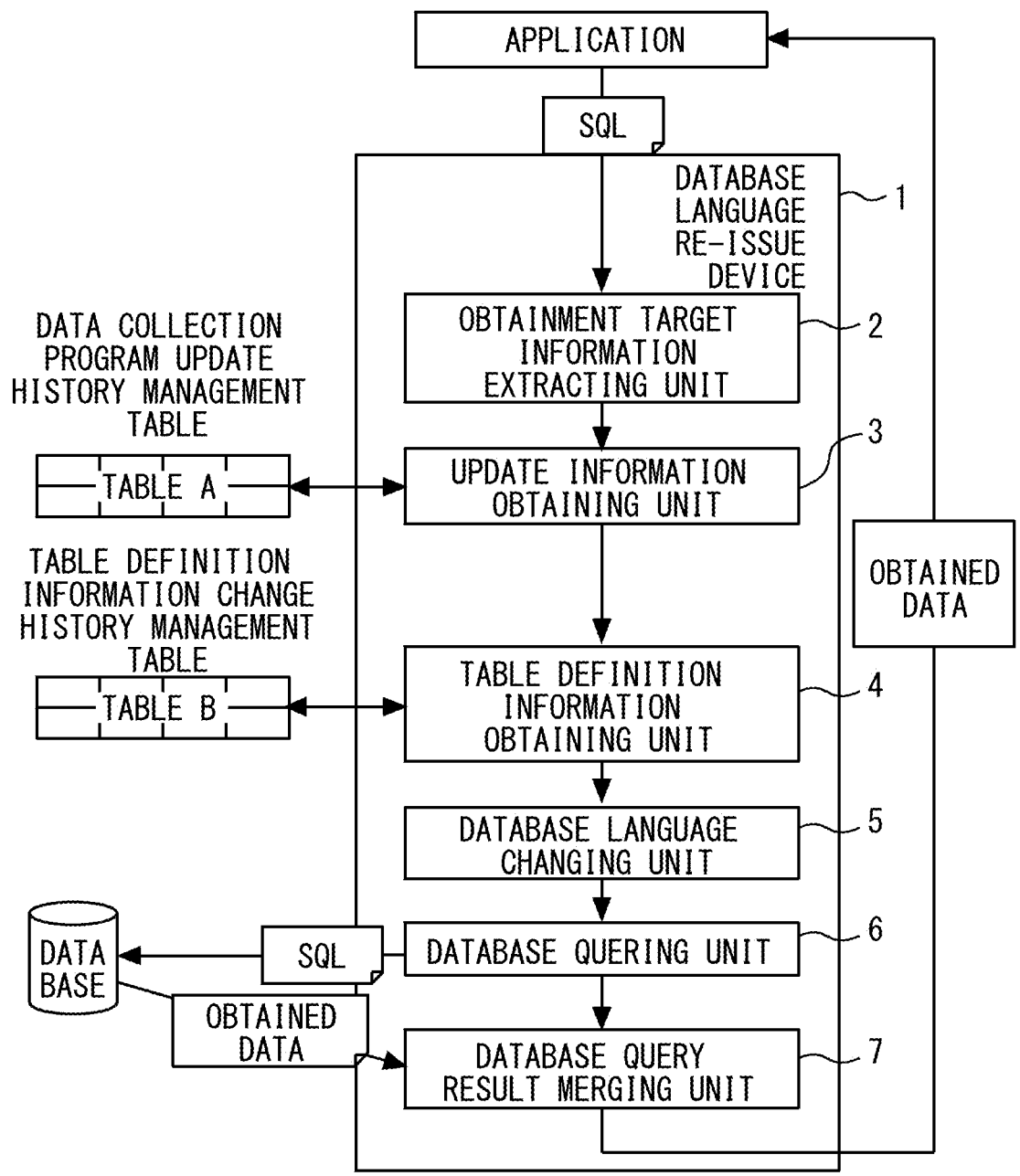
FIG. 1 is a configuration diagram of a database language re-issue device in a first embodiment.

FIG. 1 is a configuration diagram of a database language re-issue device in a first embodiment.

As shown in FIG. 1, a database language re-issue device 1 is provided with an obtainment target information extracting unit 2, an update information obtaining unit 3, a table definition information obtaining unit 4, a database language changing unit 5, a database querying unit 6 and a database query result merging unit 7.

The obtainment target information extracting unit 2 extracts a data obtainment target, a data request period, a table name and a column name from a database query issued by an application.

The update information obtaining unit 3 obtains information about a collection program of the data obtainment target for the data request period from a table A, which is a data collection program update history management table, based on an extraction result of the obtainment target information extracting unit 2.

The table definition information obtaining unit 4 obtains definition information of a table corresponding to the collection program from a table B, which is a table definition information change history management table, based on an obtainment result of the update information obtaining unit 3.

The database language changing unit 5 changes the table name and the column name in the issued database query to a table name and a column name for the data request period, based on the obtainment result of the update information obtaining unit 3 and the obtainment result of the table definition information obtaining unit 4.

The database querying unit 6 executes the database query changed by the database language changing unit 5.

The database query result merging unit 7 returns obtained data from a database to the application, the data being based on the database query of the database querying unit 6.

Next, an example of the data collection program update history management table will be explained using FIG. 2.

FIG. 2 is a diagram showing an example of the data collection program update history management table used by the database language re-issue device in the first embodiment.

As shown in FIG. 2, in the data collection program update history management table, pieces of information, "building", "elevator", "collection program", "start" and "end" are associated with each other.

The "building" is identification information about a building in which an elevator is provided. The "elevator" is identification information about the elevator. The "collection program" is information about a version of the collection program. The "start" is information about a date of starting application of the collection program. The "end" is information about a date of ending the application of the collection program.

Next, an example of the table definition information change history management table will be explained using FIG. 3.

FIG. 3 is a diagram showing an example of the table definition information change history management table used by the database language re-issue device in the first embodiment.

As shown in FIG. 3, in the table definition information change history management table, pieces of information, "initial table name", "initial column name", "collection program", "table name" and "column name" are associated with each other.

The "initial table name" is information about an initial table name. The "initial column name" is information about an initial column name. The "collection program" is information about a version of the collection program. The "table name" is information about a changed table name. The "column name" is information about a changed column name.

For example, a column "AA" in a table "TABLE01" is changed to a column "AA2" in a table "TABLE01_8" in the "8th" version of the collection program.

For example, a column "CC" in the table "TABLE01" is deleted in columns of the table "TABLE01_8" in the "8th" version of the collection program.

A column added in the 8th version of the collection program does not exist in the collection program before the 8th version.

Next, an outline of an operation of the database language re-issue device 1 will be explained using FIG. 4.

Figure 4:
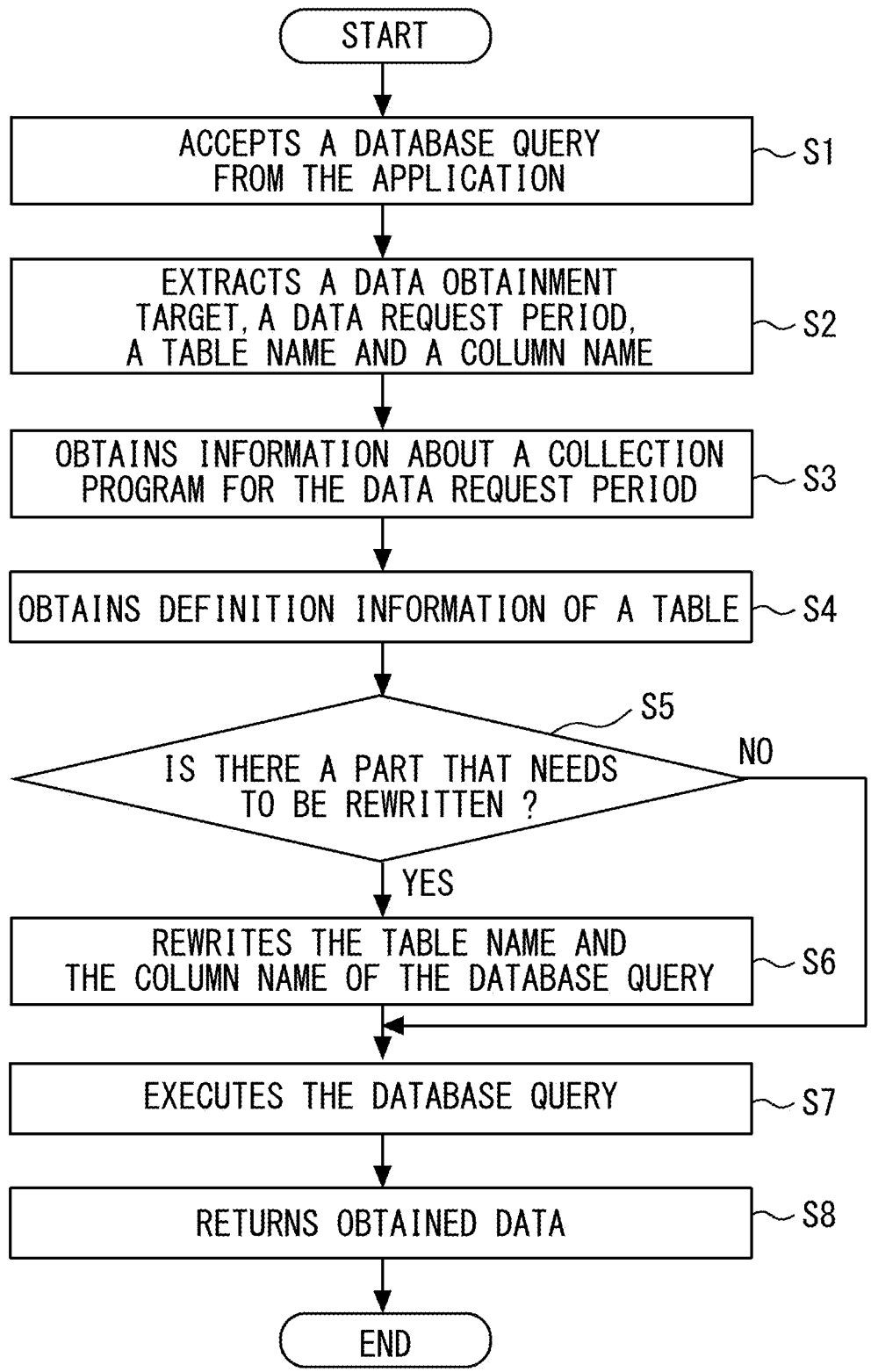
FIG. 4 is a flowchart for explaining an outline of an operation of the database language re-issue device in the first embodiment.

FIG. 4 is a flowchart for explaining the outline of the operation of the database language re-issue device in the first embodiment.

At step S1, the database language re-issue device 1 accepts a database query from the application. After that, the database language re-issue device 1 performs an operation of step S2. At step S2, the database language re-issue device 1 extracts a data obtainment target, a data request period, a table name and a column name.

After that, the database language re-issue device 1 performs an operation of step S3. At step S3, the database language re-issue device 1 obtains information about a collection program for the data request period. After that, the database language re-issue device 1 performs an operation of step S4. At step S4, the database language re-issue device 1 obtains definition information of a table.

After that, the database language re-issue device 1 performs an operation of step S5. At step S5, the database language re-issue device 1 judges whether or not there is a part that needs to be rewritten in the table name or the column name.

If there is a part that needs to be rewritten at step S5, the database language re-issue device 1 performs an operation of step S6. At step S6, the database language re-issue device 1 rewrites the table name and the column name of the database query.

If there is not a part that needs to be rewritten at step S5, or after step S6, the database language re-issue device 1 performs an operation of step S7. At step S7, the database language re-issue device 1 executes the database query.

After that, the database language re-issue device 1 performs an operation of step S8. At step S8, the database language re-issue device 1 returns obtained data. After that, the database language re-issue device 1 ends the operation.

According to the first embodiment explained above, the database language re-issue device 1 executes a database query corresponding to a data obtainment target, a data request period and a data item. Therefore, it is possible to appropriately obtain data from a database. At this time, it is unnecessary to change a database language on a side calling the database language re-issue device 1. Therefore, it is possible to make it unnecessary to change the application that issues a query.

Especially, in the case of an elevator, a worker updates the collection program for each elevator. Therefore, collection program update timings are different among a plurality of elevators. As a result, a definition of a table differs for each data obtainment target and a date request period. If the database language re-issue device 1 of the first embodiment is applied at the time of collecting data of such elevators, it is possible to appropriately obtain the data of the elevators from a database.

Further, if the database language re-issue device 1 of the first embodiment is applied when data that can be measured differs according to models, it is possible to appropriately obtain data without necessity to change the application that issues a query.

Further, if the database language re-issue device 1 of the first embodiment is applied when data that can be obtained differs according to contracts, it is possible to appropriately obtain data without necessity to change the application that issues a query.

Further, if the database language re-issue device 1 of the first embodiment is applied when an amount of data that can be obtained differs according to data transmission paths, it is possible to appropriately obtain data without necessity to change the application that issues a query.

Next, an example of the database language re-issue device 1 will be explained using FIG. 5.

Figure 5:
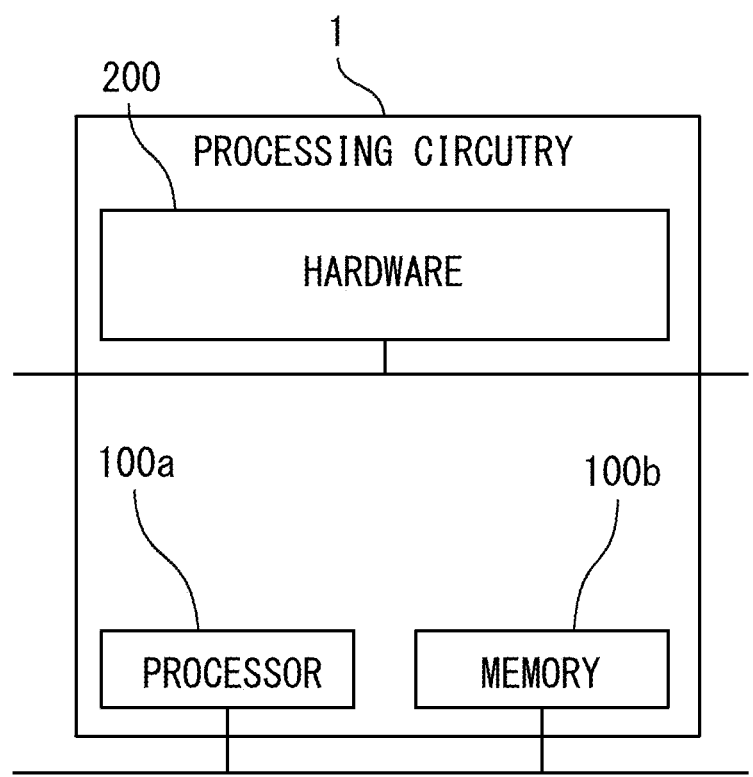
FIG. 5 is a hardware configuration diagram of the database language re-issue device in the first embodiment.

FIG. 5 is a hardware configuration diagram of the database language re-issue device in the first embodiment.

Each function of the database language re-issue device 1 can be realized by processing circuitry. For example, the processing circuitry is provided with at least one processor 100a and at least one memory 100b. For example, the processing circuitry is provided with at least one piece of dedicated hardware 200.

When the processing circuitry is provided with the at least one processor 100a and the at least one memory 100b, each function of the database language re-issue device 1 is realized by software, firmware or a combination of software and firmware. At least either the software or the firmware is written as a program. At least either the software or the firmware is stored in the at least one memory 100b. The at least one processor 100a realizes each function of the database language re-issue device 1 by reading out and executing the program stored in the at least one memory 100b. The at least one processor 100a is also referred to as a central processing unit, a processing device, an arithmetic device, a microprocessor, a microcomputer or a DSP. For example, the at least one memory 100b is a nonvolatile or volatile semiconductor memory such as a RAM, a ROM, a flash memory, an EPROM or an EEPROM, a magnetic disk, a flexible disk, an optical disk, a compact disk, a mini disk, a DVD or the like.

When the processing circuitry is provided with the at least one piece of dedicated hardware 200, the processing circuitry is realized, for example, by a single circuit, a composite circuit, a programmed processor, a parallel-programmed processor, an ASIC, an FPGA or a combination thereof. For example, the functions of the database language re-issue device 1 are realized by multiple processing circuitry, respectively. For example, the functions of the database language re-issue device 1 are collectively realized by a piece of processing circuitry.

For the functions of the database language re-issue device 1, a part may be realized by the dedicated hardware 200, and other parts may be realized by the software or firmware. For example, it is possible to realize a function of the obtainment target information extracting unit 2 by processing circuitry as the dedicated hardware 200 and realize functions other than the function of the obtainment target information extracting unit 2 by the at least one processor 100a reading out and executing the program stored in the at least one memory 100b.

Thus, the processing circuitry realize each function of the database language re-issue device 1 by the hardware 200, software, firmware or a combination thereof.

Second Embodiment

Figure 6:
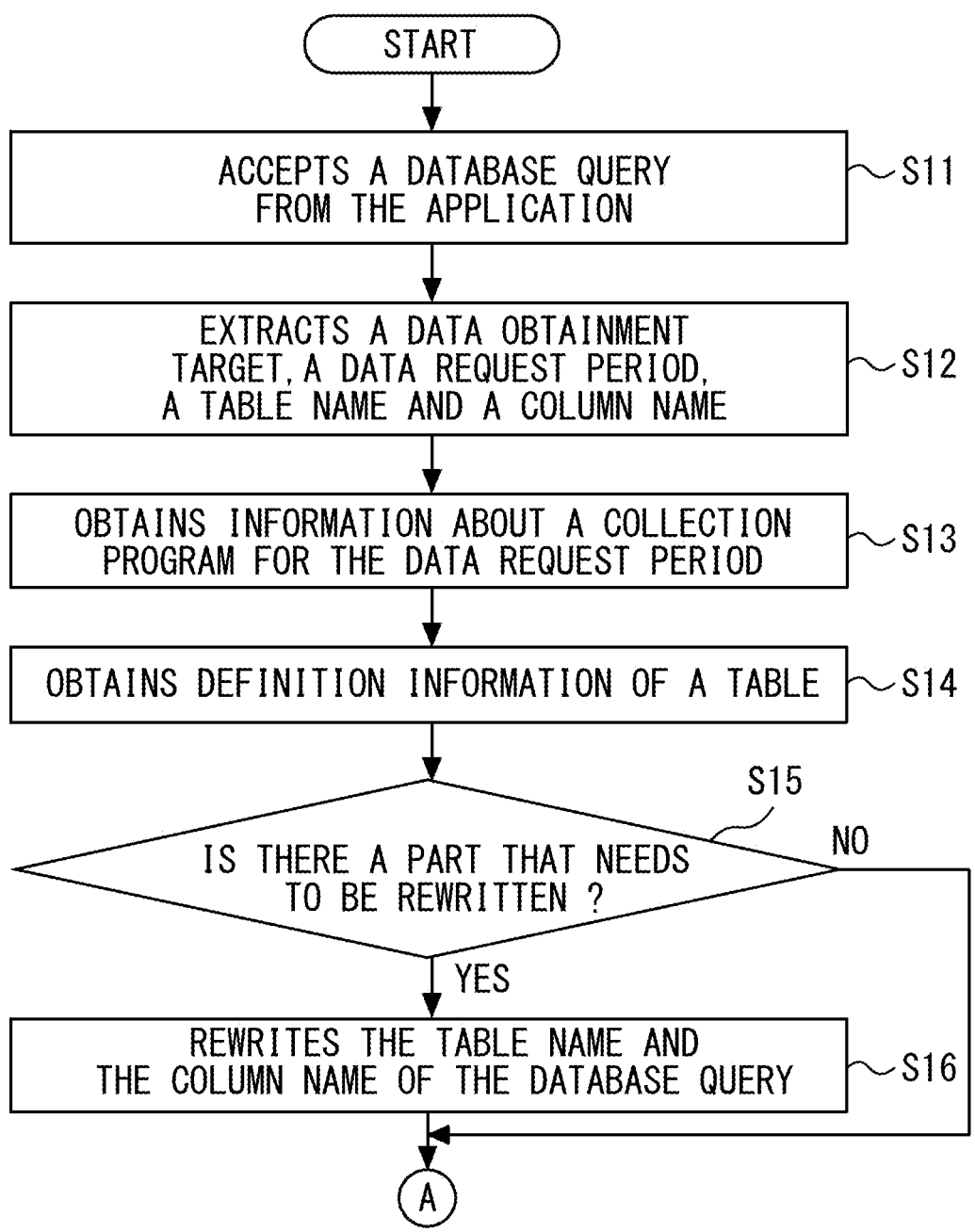
FIG. 6 is a flowchart for explaining an outline of an operation of a database language re-issue device in a second embodiment.
Figure 7:
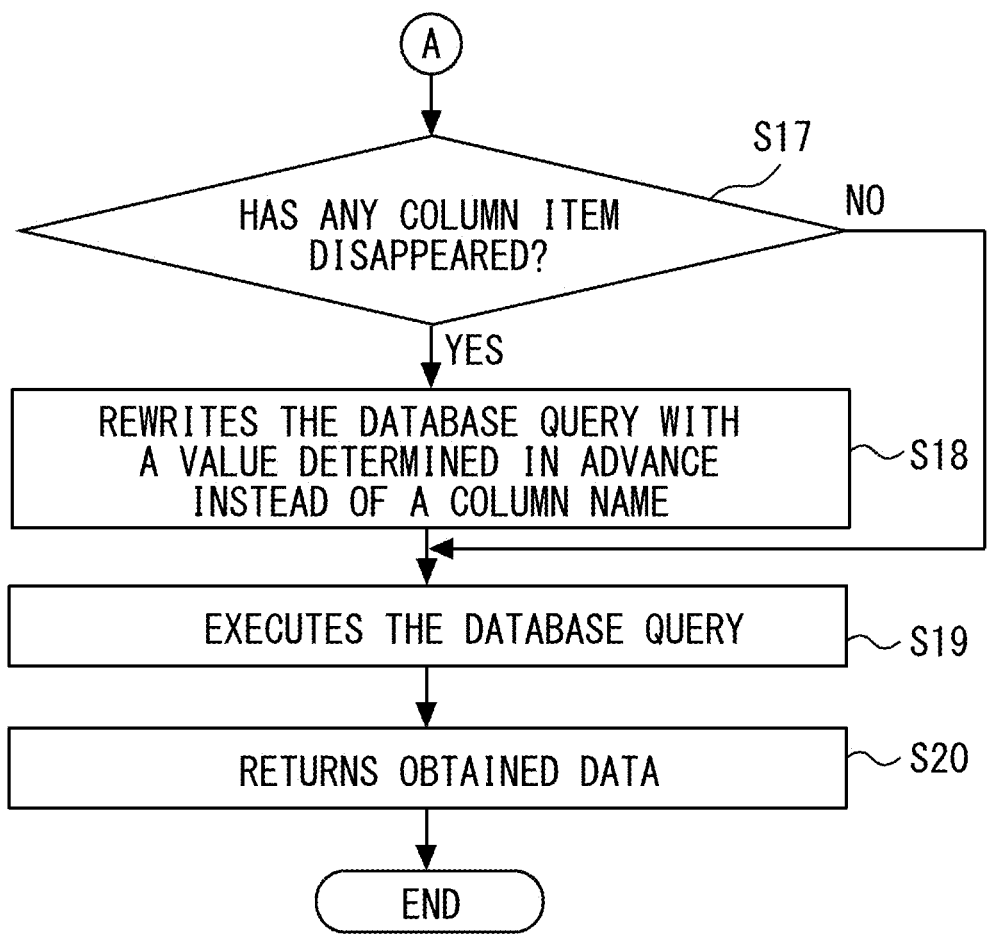
FIG. 7 is the flowchart for explaining the outline of the operation of the database language re-issue device in the second embodiment.

FIGS. 6 and 7 are a flowchart for explaining an outline of an operation of a database language re-issue device in a second embodiment. Parts that are the same or corresponding to parts of the first embodiment are given the same reference signs. Explanation of the parts will be omitted.

In the embodiment, steps S11 to S16 are the same as steps S1 to S6 in FIG. 4. After step S16, the database language re-issue device 1 performs an operation of step S17. At step S17, the database language re-issue device 1 judges whether any column item has disappeared or not.

If any column item has disappeared at step S17, the database language re-issue device 1 performs an operation of step S18. At step S18, the database language re-issue device 1 rewrites the database query with a value determined in advance instead of a column name.

If no column item has disappeared at step S17, or after step S18, the database language re-issue device 1 performs an operation of step S19.

Steps S19 and S20 are the same as steps S7 and S8 in FIG. 4.

According to the second embodiment explained above, if a data item for a data request period corresponding to a data item in a query does not exist, the database language re-issue device 1 returns a value determined in advance as the data item for the data request period. Even if a data item is changed, it is possible to prevent an error from being outputted.

Third Embodiment

Figure 8:
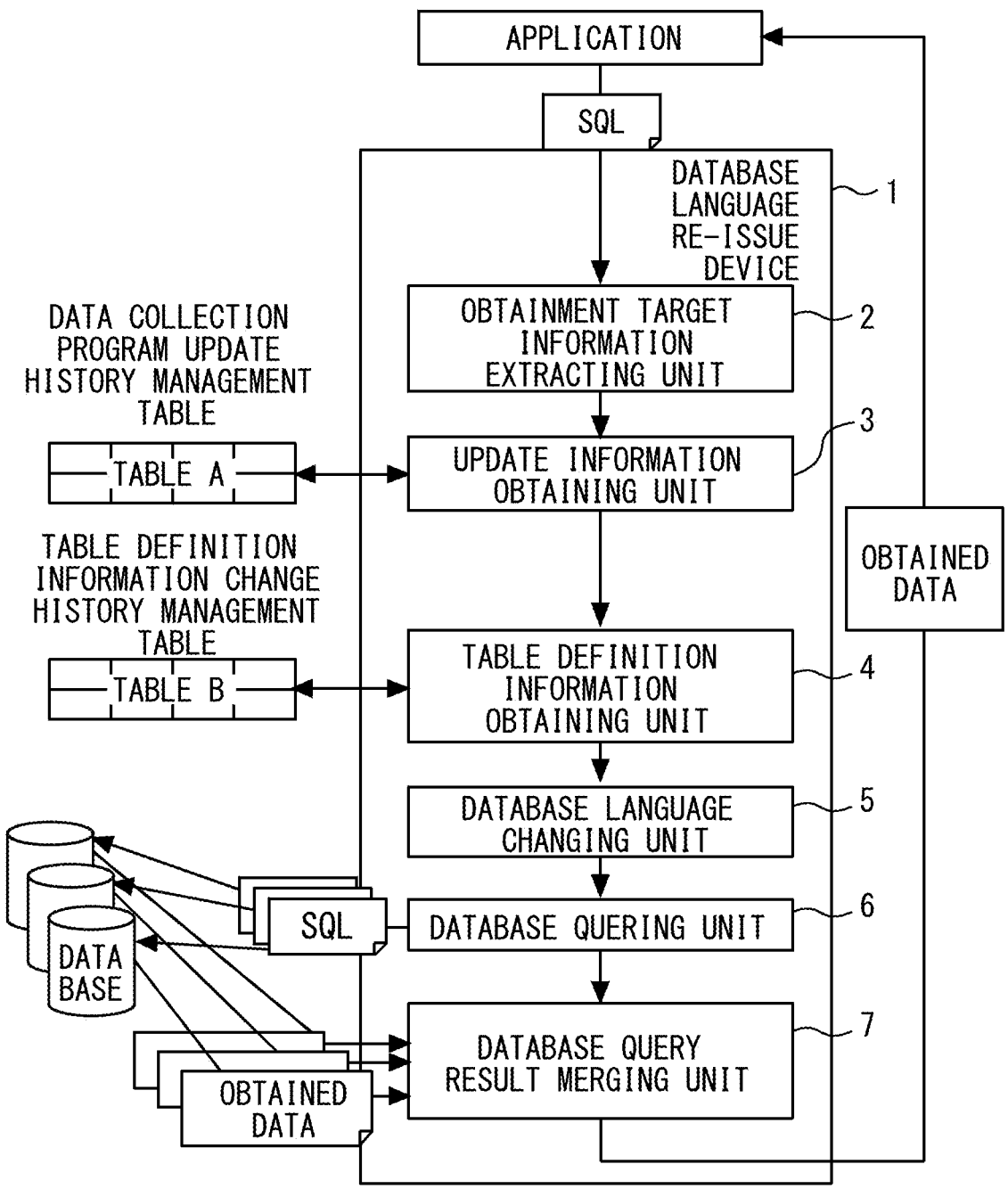
FIG. 8 is a configuration diagram of a database language re-issue device in a third embodiment.

FIG. 8 is a configuration diagram of a database language re-issue device in a third embodiment. Parts that are the same or corresponding to parts of the first embodiment are given the same reference signs. Explanation of the parts will be omitted.

The update information obtaining unit 3 obtains pieces of information about all collection programs of a data obtainment target for a data request period and corresponding data periods from the table A.

The table definition information obtaining unit 4 obtains pieces of definition information of tables corresponding to all the collection programs from the table B.

The database language changing unit 5 changes a table name, a column name and a data request period in an issued database query for each collection program, based on an obtainment result of the update information obtaining unit 3 and an obtainment result of the table definition information obtaining unit 4, and changes the one database query to a plurality of database queries.

The database querying unit 6 executes the plurality of database queries changed by the database language changing unit 5.

The database query result merging unit 7 merges a plurality of pieces of obtained data from databases into one and returns the merged data to the application, the plurality of pieces of data being based on the database queries of the database querying unit 6.

Next, a first example of the table definition information change history management table will be explained using FIG. 9.

FIG. 9 is a diagram showing the first example of the table definition information change history management table used by the database language re-issue device in the third embodiment.

For a data request period in a database query at an upper part of FIG. 9, the "8th" and "9th" versions of the collection program correspond, in the table definition information change history management table at a lower part of FIG. 9.

In this case, as a data period for the "8th" version of the collection program, a period of "2017/7/1" to "2017/8/23" is applied. As a data period for the "9th" version of the collection program, a period of "2017/8/24" to "2017/10/23" is applied.

Next, a second example of the table definition information change history management table will be explained using FIG. 10.

FIG. 10 is a diagram showing the second example of the table definition information change history management table used by the database language re-issue device in the third embodiment.

To elevators "1" and "2" as query targets of a database query at an upper part of FIG. 10, the "9th" and "7th" versions of the collection program correspond, in the table definition information change history management table at a lower part of FIG. 10.

In this case, to the elevator "1" of a building "003", the "9th" version of the collection program is applied. To the elevator "2" of a building "015", the "7th" version of the collection program is applied.

Next, an outline of an operation of the database language re-issue device 1 will be explained using FIGS. 11 to 13.

Figure 11:
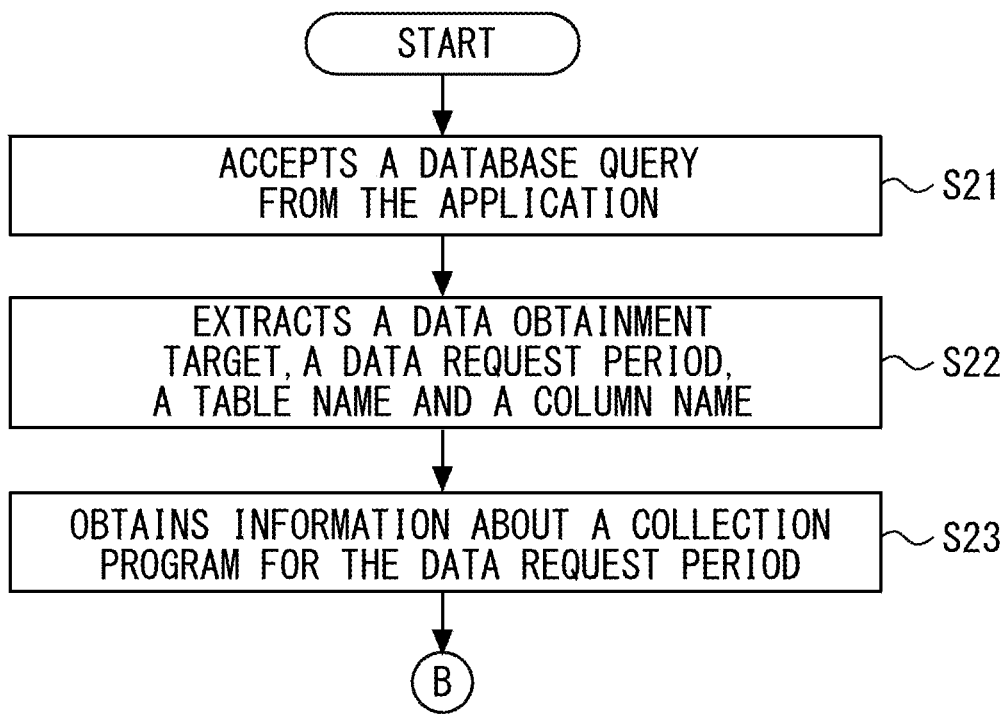
FIG. 11 is a flowchart for explaining an outline of an operation of the database language re-issue device in the third embodiment.
Figure 12:
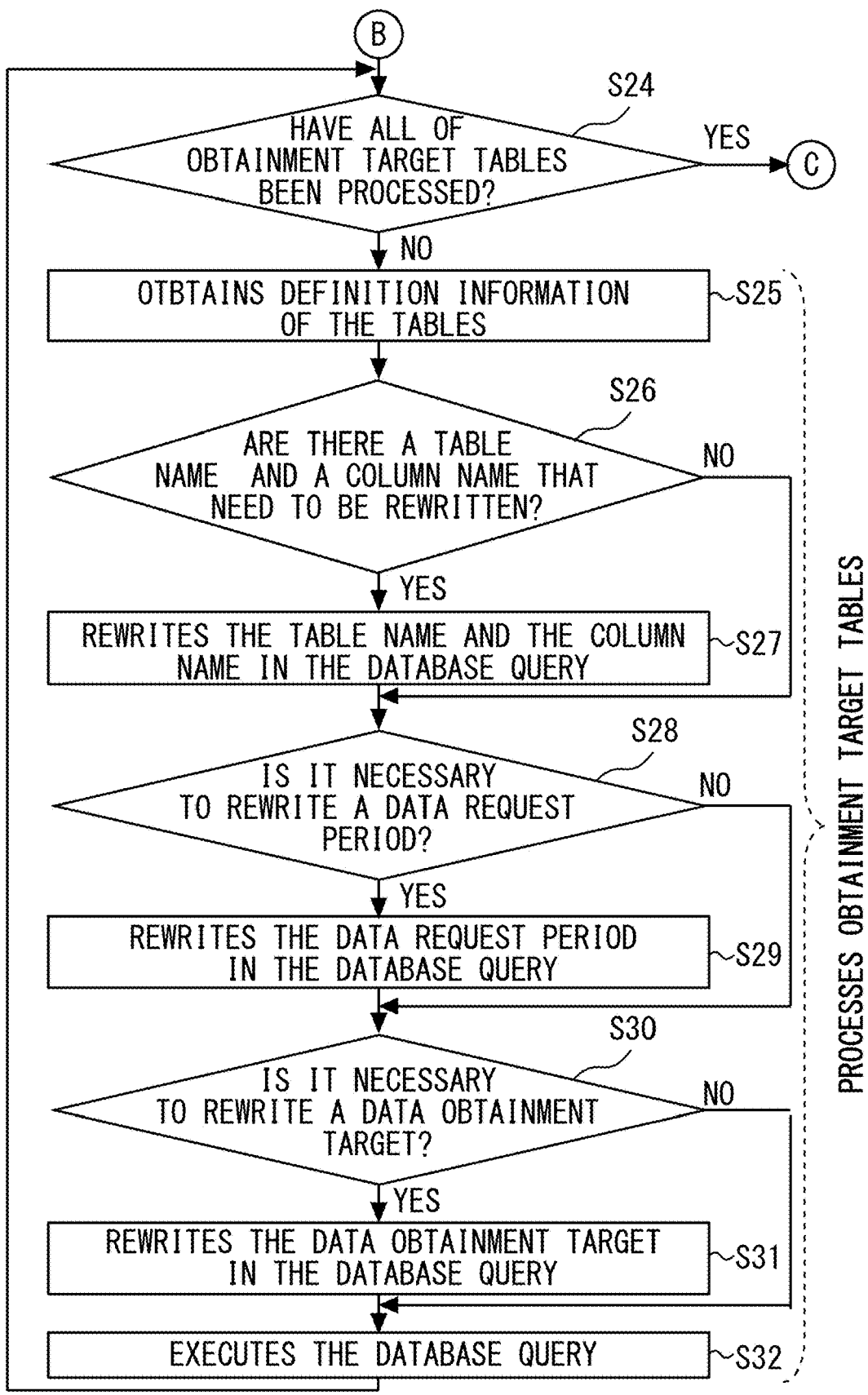
FIG. 12 is the flowchart for explaining the outline of the operation of the database language re-issue device in the third embodiment.
Figure 13:
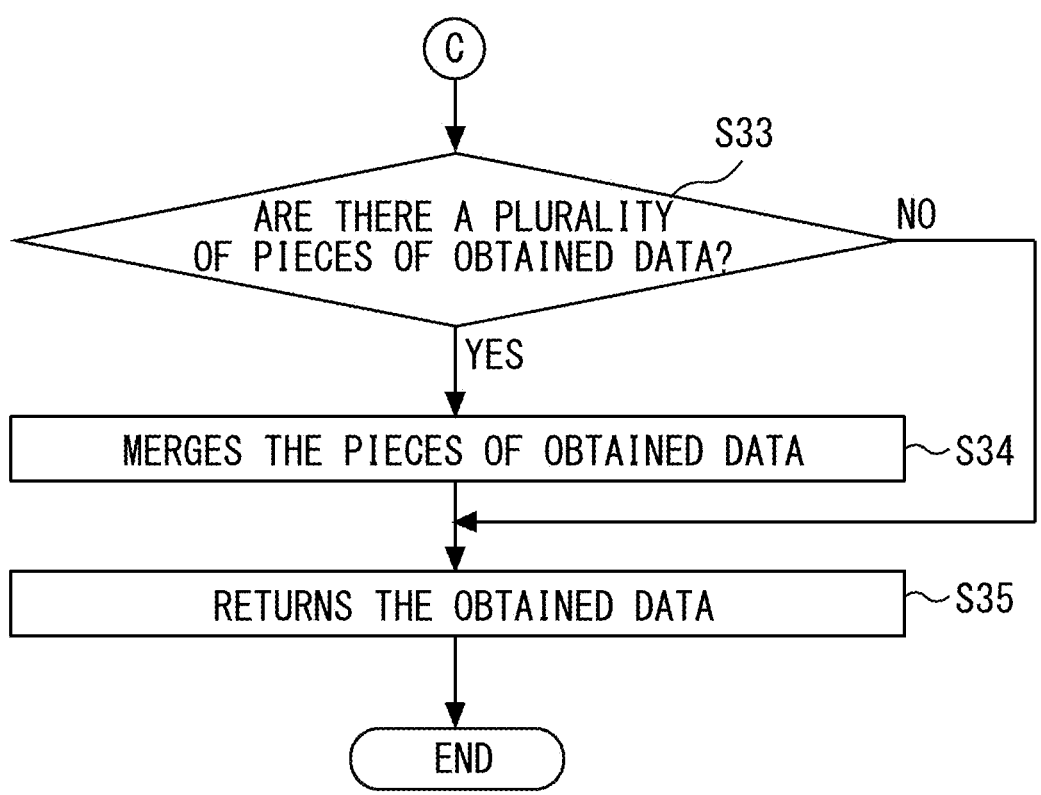
FIG. 13 is the flowchart for explaining the outline of the operation of the database language re-issue device in the third embodiment.

FIGS. 11 to 13 are a flowchart for explaining the outline of the operation of the database language re-issue device in the third embodiment.

Steps S21 to S23 are the same as steps S1 to S3 in FIG. 4.

After step S23, the database language re-issue device 1 performs an operation of step S24. At step S24, the database language re-issue device 1 judges whether all of obtainment target tables have been processed or not.

If all of the obtainment target tables have not been processed at step S24, the database language re-issue device 1 performs an operation of step S25. At step S25, the database language re-issue device 1 obtains definition information of the tables. After that, the database language re-issue device 1 performs an operation of step S26. At step S26, the database language re-issue device 1 judges whether or not there are a table name and a column name that need to be rewritten.

If there are a table name and a column name that need to be rewritten at step S26, the database language re-issue device 1 performs an operation of step S27. At step S27, the database language re-issue device 1 rewrites the table name and the column name in the database query.

If there are neither a table name nor a column name that needs to be rewritten at step S26, or after step S27, the database language re-issue device 1 performs an operation of step S28. At step S28, the database language re-issue device 1 judges whether it is necessary to rewrite a data request period.

If it is necessary to rewrite the data request period at step S28, the database language re-issue device 1 performs an operation of step S29. At step S29, the database language re-issue device 1 rewrites the data request period in the database query.

If it is not necessary to rewrite the data request period at step S28, or after step S29, the database language re-issue device 1 performs an operation of step S30. At step S30, the database language re-issue device 1 judges whether it is necessary to rewrite a data obtainment target.

If it is necessary to rewrite the data obtainment target at step S30, the database language re-issue device 1 performs an operation of step S31. At step S31, the database language re-issue device 1 rewrites the data obtainment target in the database query.

If it is not necessary to rewrite the data obtainment target at step S30, or after step S31, the database language re-issue device 1 performs an operation of step S32. At step S32, the database language re-issue device 1 executes the database query. After that, the database language re-issue device 1 performs an operation of step S24.

If all the data obtainment target tables have been processed at step S24, the database language re-issue device 1 performs an operation of step S33. At step S33, the database language re-issue device 1 judges whether there are a plurality of pieces of obtained data.

If there are a plurality of pieces of obtained data at step S33, the database language re-issue device 1 performs an operation of step S34. At step S34, the database language re-issue device 1 merges the pieces of obtained data.

If there are not a plurality of pieces of obtained data at step S33, or after step S34, the database language re-issue device 1 performs an operation of step S35. At step S35, the database language re-issue device 1 returns the obtained data. After that, the database language re-issue device 1 ends the operation.

According to the third embodiment explained above, the database language re-issue device 1 changes a data item in a query to a plurality of data items for a data request period, based on obtained pieces of definition information of a plurality of tables. Therefore, even if there are a plurality of collection programs, it is possible to appropriately obtain data from a database.

Fourth Embodiment

Figure 14:
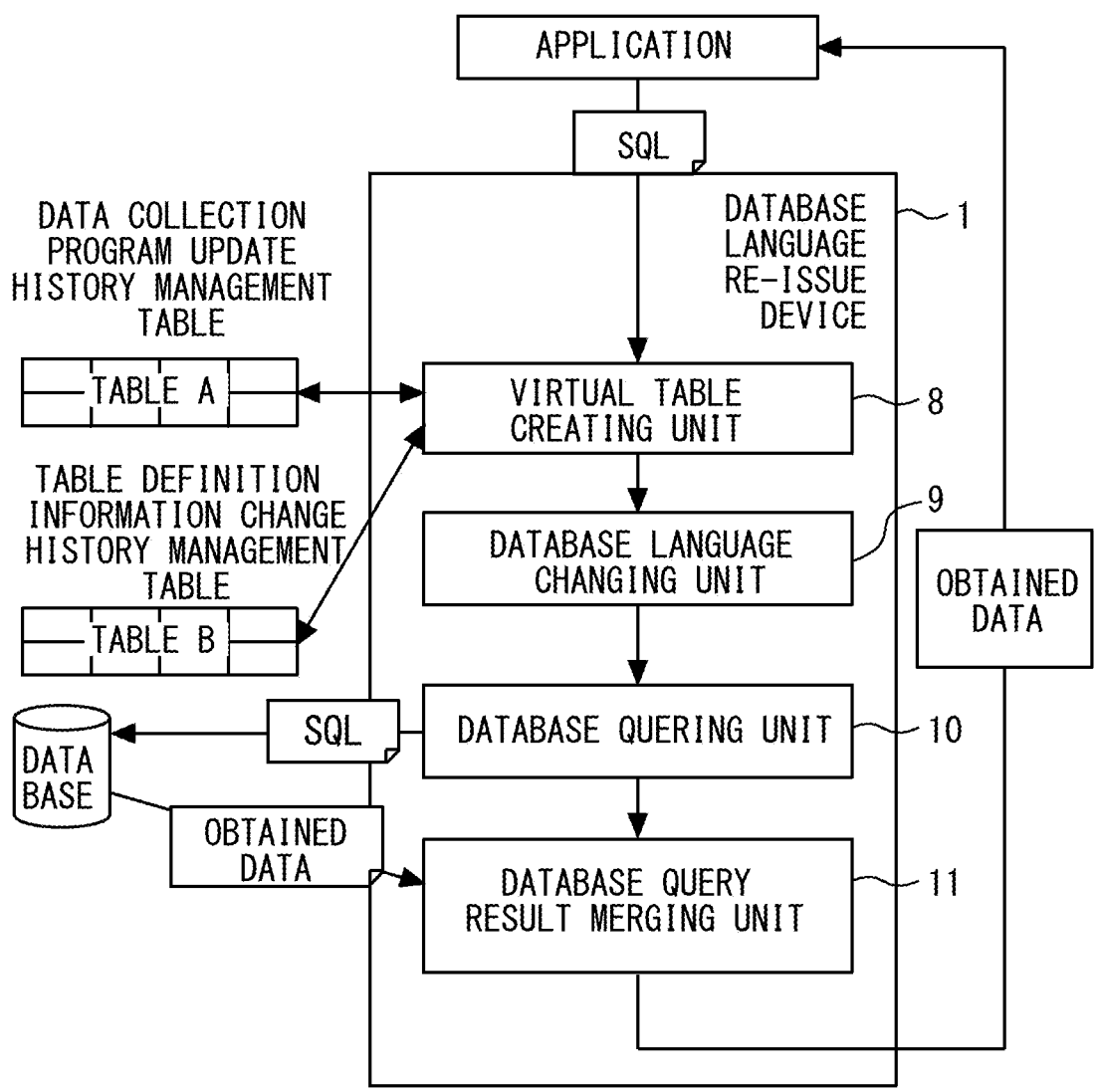
FIG. 14 is a configuration diagram of a database language re-issue device in a fourth embodiment.

FIG. 14 is a configuration diagram of a database language re-issue device in a fourth embodiment. Parts that are the same or corresponding to parts of the first embodiment are given the same reference signs. Explanation of the parts will be omitted.

A database language re-issue device 1 is provided with a virtual table creating unit 8, a database language changing unit 9, a database querying unit 10 and a database query result merging unit 11.

The virtual table creating unit 8 creates a virtual table including all table definitions within a requested range of an issued database query.

The database language changing unit 9 changes a table name in the issued database query to a table name of a virtual table.

The database querying unit 10 executes the changed database query.

The database query result merging unit 11 returns obtained data from a database to the application.

Next, the virtual table creating unit 8 will be explained using FIG. 15.

Figure 15:
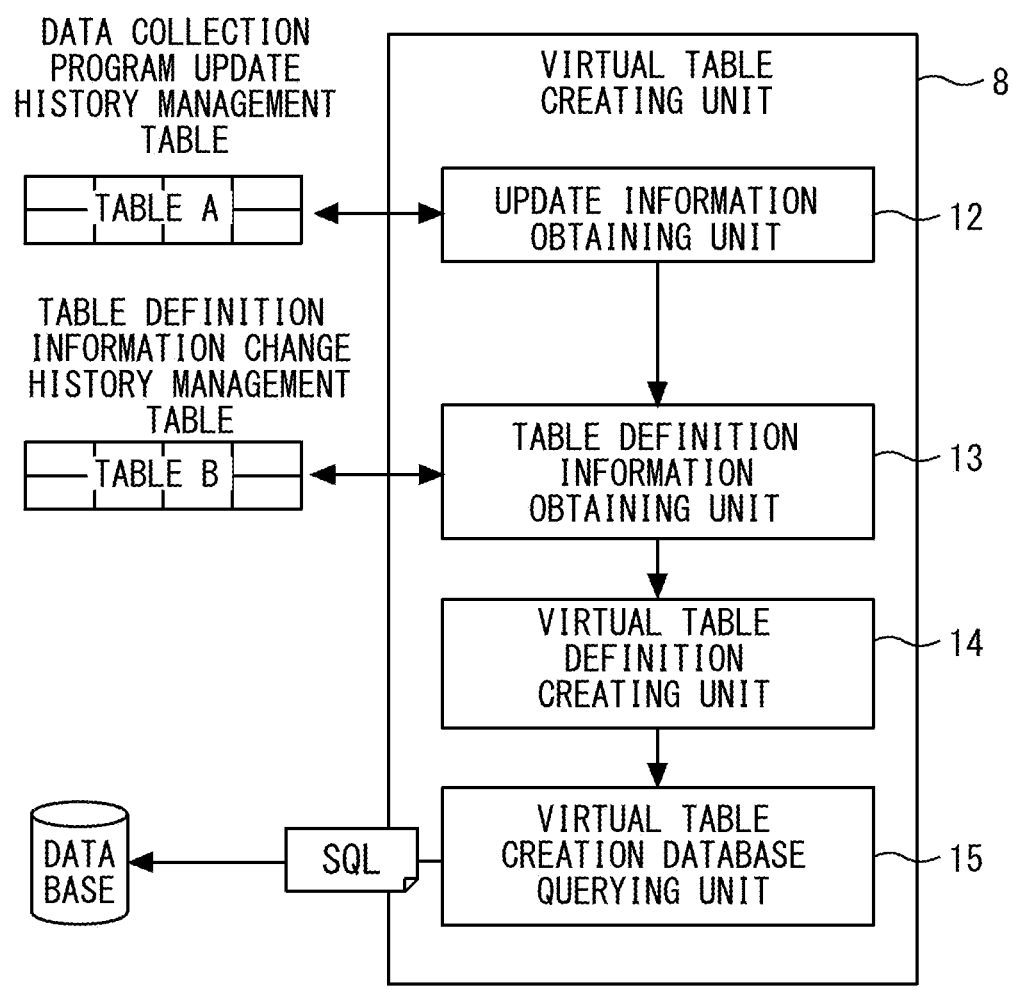
FIG. 15 is a configuration diagram of a virtual table creating unit of the database language re-issue device in the fourth embodiment.

FIG. 15 is a configuration diagram of the virtual table creating unit of the database language re-issue device in the fourth embodiment.

As shown in FIG. 15, the virtual table creating unit 8 is provided with an update information obtaining unit 12, a table definition information obtaining unit 13, a virtual table definition creating unit 14 and a virtual table creation database querying unit 15.

The update information obtaining unit 12 obtains pieces of information about all collection programs from the table A.

The table definition information obtaining unit 13 obtains pieces of definition information of all tables corresponding to all the collection programs from the table B.

The virtual table definition creating unit 14 creates a definition of a virtual table that includes definitions of all the tables, based on an obtainment result of the update information obtaining unit 12 and an obtainment result of the table definition information obtaining unit 13.

The virtual table creation database querying unit 15 creates a virtual table that has the definition created by the virtual table definition creating unit 14 and is for referring to pieces of information in all the tables, in a database.

Next, an example of the virtual table will be explained using FIG. 16.

Figure 16:
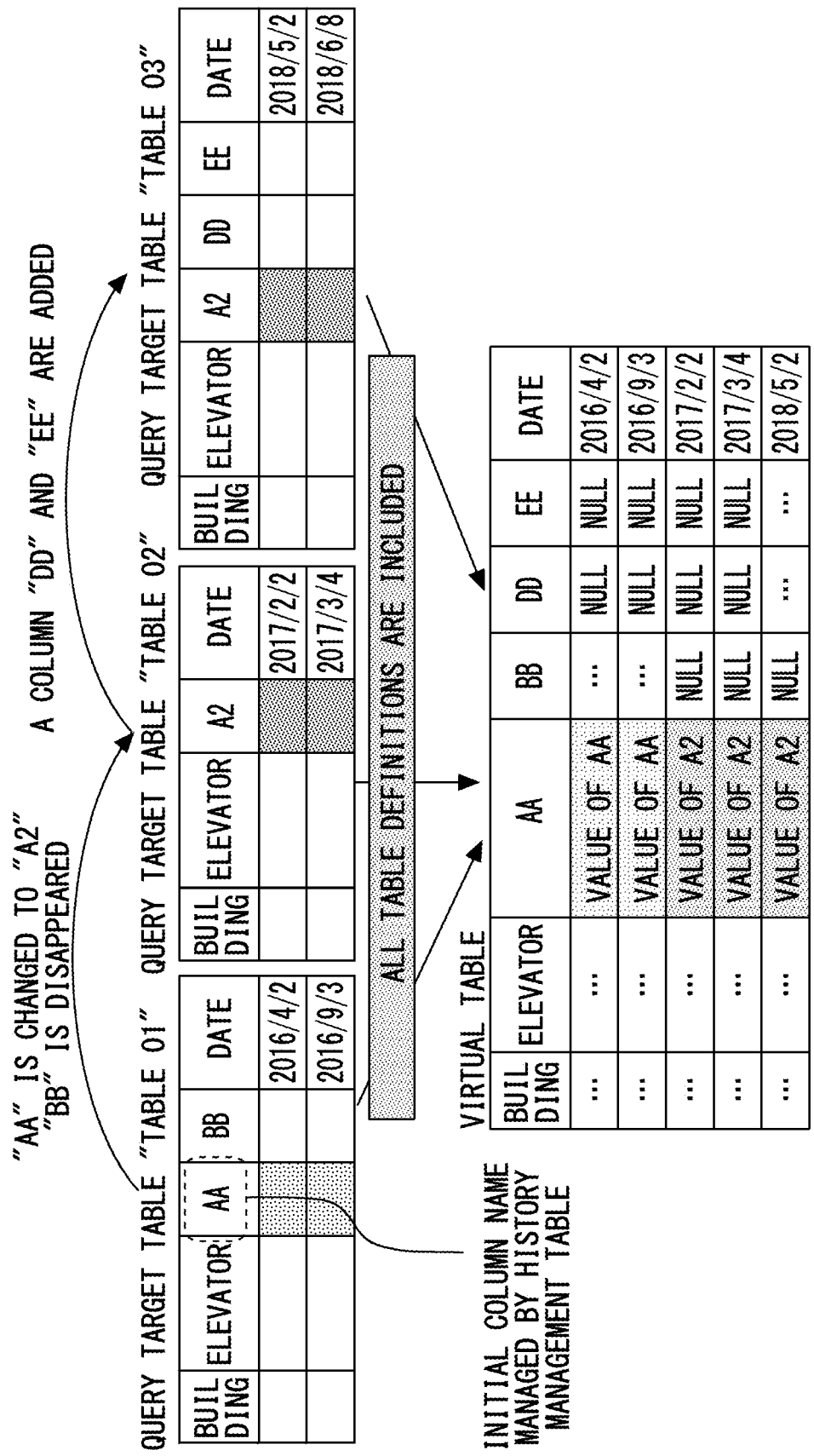
FIG. 16 is a diagram showing an example of a virtual table used by the database language re-issue device in the fourth embodiment.

FIG. 16 is a diagram showing an example of the virtual table used by the database language re-issue device in the fourth embodiment As shown in FIG. 16, in change from a "query target table TABLE01" to a "query target table TABLE02", a column "AA" is changed to a column "A2". A column "BB" has disappeared.

In change from the "query target table TABLE02" to a "query target table TABLE03", a column "DD" and a column "EE" are added.

In this case, on the virtual table, the change from the column "AA" to the column "A2", the deletion of the column "BB" and the addition of the column "DD" and the column "EE" are reflected.

According to the fourth embodiment explained above, the database language re-issue device 1 creates a virtual table that includes all table definitions within a requested range of a query. Therefore, it is possible to appropriately obtain data from a database.

In the first to fourth embodiments, the various kinds of data may be managed by files.

INDUSTRIAL APPLICABILITY

As described above, a database language re-issue device according to the present invention can be used for a data analysis system.

REFERENCE SIGNS LIST

1 Database language re-issue device
2 Obtainment target information extracting unit
3 Update information obtaining unit
4 Table definition information obtaining unit
5 Database language changing unit
6 Database querying unit
7 Database query result merging unit
8 Virtual table creating unit
9 Database language changing unit
10 Database querying unit
11 Database query result merging unit
12 Update information obtaining unit
13 Table definition information obtaining unit
14 Virtual table definition creating unit
15 Virtual table creation database querying unit
100a Processor
100b Memory
200 Hardware

The invention claimed is:

1. A database language re-issue device of an elevator system, comprising:
processing circuitry of the database language re-issue device of the elevator system, the processing circuitry including memory and being configured:
to extract a data obtainment target, a data request period, and a data item from an electronic query issued by an elevator-specific application, the data obtainment target corresponding to one of a plurality of predetermined different elevators;
to obtain information about a collection program of the extracted data obtainment target for the extracted data request period from a first table, the first table including elevator information for the plurality of predetermined different elevators, the elevator information including the collection program of the extracted data obtainment target and a corresponding collection program for each predetermined elevator of the plurality of predetermined different elevators;
to obtain definition information of a second table specific for the obtained collection program of the extracted data obtainment target in order to determine whether to change the data item in the electronic query issued by the elevator-specific application to another data item for the data request period based on the obtained definition information of the second table that is specific for the obtained collection program of the extracted data obtainment target;
to determine that the data item in the electronic query issued by the elevator-specific application is to be changed in the second table to said another data item for the data request period;
to change the data item from the electronic query issued by the elevator-specific application to said another data item for the data request period based on the obtained definition information of the second table that is specific for the obtained collection program without changing a database language associated with the elevator-specific application;
to execute an electronic query to a database external to the database language re-issue device based on the changed data item without changing the database language associated with the elevator-specific application; and
to output obtained data from the database to the elevator-specific application without changing the database language associated with the elevator-specific application, the obtained data being based on the executed electronic query to the database external to the database language re-issue device based on the changed data item.

2. The database language re-issue device according to claim 1, wherein:
the processing circuitry is configured to return a value determined in advance as the data item for the data request period, under a condition where the data item for the data request period corresponding to the data item in the electronic query to the database external to the database language re-issue device does not exist.

3. The database language re-issue device according to claim 1, wherein the processing circuitry is configured:
to change the data item in the electronic query issued by the elevator-specific application to said another data item in the form of a plurality of data items for the data request period based on pieces of obtained definition information of a plurality of tables to execute a plurality of the electronic queries to the database external to the database language re-issue device based on the plurality of changed data items; and to merge a plurality of pieces of obtained data from databases and return the merged data to the elevator-specific application, the plurality of pieces of data being based on the executed electronic queries to the database external to the database language re-issue device.

4. The database language re-issue device according to claim 1, wherein the processing circuitry is configured:

to create a virtual table including all table definitions within a requested range of the electronic query issued by the elevator-specific application; and to change the data item in the electronic query issued by the elevator-specific application to a data item in the created virtual table.

5. A method comprising:

extracting, using an electronic database language re-issue device, a data obtainment target, a data request period, and a data item from an electronic query issued by an elevator-specific application, the data obtainment target corresponding to one of a plurality of predetermined different elevators;

obtaining, using the electronic database language re-issue device, information about a collection program of the extracted data obtainment target for the extracted data request period from a first table, the first table including elevator information for the plurality of predetermined different elevators, the elevator information including the collection program of the extracted data obtainment target and a corresponding collection program for each predetermined elevator of the plurality of predetermined different elevators;

obtaining, using the electronic database language re-issue device, definition information of a second table specific for the obtained collection program of the extracted data obtainment target in order to determine whether to change the data item in the electronic query issued by the elevator-specific application to another data item for the data request period based on the obtained definition information of the second table that is specific for the obtained collection program of the extracted data obtainment target;

determining, using the electronic database language re-issue device, that the data item in the electronic query issued by the elevator-specific application is to be changed in the second table to said another data item for the data request period;

changing, using the electronic database language re-issue device, the data item from the electronic query issued by the elevator-specific application to said another data item for the data request period based on the obtained definition information of the second table that is specific for the obtained collection program without changing a database language associated with the elevator-specific application;

executing, using the electronic database language re-issue device, an electronic query to a database external to the database language re-issue device based on the changed data item without changing the database language associated with the elevator-specific application; and outputting, using the electronic database language re-issue device, obtained data from the database to the elevator-specific application without changing the database language associated with the elevator-specific application, the obtained data being based on the executed electronic query to the database external to the database language re-issue device based on the changed data item.

6. The method according to claim 5, further comprising returning, using the electronic database language re-issue device, a value determined in advance as the data item for the data request period, under a condition where the data item for the data request period corresponding to the data item in the electronic query to the database external to the database language re-issue device does not exist.

7. The method according to claim 5, further comprising:

changing, using the electronic database language re-issue device, the data item in the electronic query issued by the elevator-specific application to said another data item in the form of a plurality of data items for the data request period based on pieces of obtained definition information of a plurality of tables to execute a plurality of the electronic queries to the database external to the database language re-issue device based on the plurality of changed data items; and merging, using the electronic database language re-issue device, a plurality of pieces of obtained data from databases and return the merged data to the elevator-specific application, the plurality of pieces of data being based on the executed electronic queries to the database external to the database language re-issue device.

8. The method according to claim 5, further comprising:

creating, using the electronic database language re-issue device, a virtual table including all table definitions within a requested range of the electronic query issued by the elevator-specific application; and changing, using the electronic database language re-issue device, the data item in the electronic query issued by the elevator-specific application to a data item in the created virtual table.

9. An elevator comprising:

a database language re-issue device of the elevator system including:

processing circuitry configured:

to extract a data obtainment target, a data request period, and a data item from an electronic query issued by an elevator-specific application, the data obtainment target corresponding to one of a plurality of predetermined different elevators;

to obtain information about a collection program of the extracted data obtainment target for the extracted data request period from a first table, the first table including elevator information for the plurality of predetermined different elevators, the elevator information including the collection program of the extracted data obtainment target and a corresponding collection program for each predetermined elevator of the plurality of predetermined different elevators;

to obtain definition information of a second table specific for the obtained collection program of the extracted data obtainment target in order to determine whether to change the data item in the electronic query issued by the elevator-specific application to another data item for the data request period based on the obtained definition information of the second table that is specific for the obtained collection program of the extracted data obtainment target;

to determine that the data item in the electronic query issued by the elevator-specific application is to be changed in the second table to said another data item for the data request period;

to change the data item from the electronic query issued by the elevator-specific application to said another data item for the data request period based on the obtained definition information of the second table that is specific for the obtained collection program without changing a database language associated with the elevator-specific application;

to execute an electronic query to a database external to the database language re-issue device based on the changed data item without changing the database language associated with the elevator-specific application; and to output obtained data from the database to the elevator-specific application without changing the database language associated with the elevator-specific application, the obtained data being based on the executed electronic query to the database external to the database language re-issue device based on the changed data item.

10. The elevator according to claim 9, wherein:

the processing circuitry is configured to return a value determined in advance as the data item for the data request period, under a condition where the data item for the data request period corresponding to the data item in the electronic query to the database external to the database language re-issue device does not exist.

11. The elevator according to claim 9, wherein the processing circuitry is configured:

to change the data item in the electronic query issued by the elevator-specific application to said another data item in the form of a plurality of data items for the data request period based on pieces of obtained definition information of a plurality of tables to execute a plurality of the electronic queries to the database external to the database language re-issue device based on the plurality of changed data items; and to merge a plurality of pieces of obtained data from databases and return the merged data to the elevator-specific application, the plurality of pieces of data being based on the executed electronic queries to the database external to the database language re-issue device.

12. The elevator according to claim 9, wherein the processing circuitry is configured:

to create a virtual table including all table definitions within a requested range of the electronic query issued by the elevator-specific application; and to change the data item in the electronic query issued by the elevator-specific application to a data item in the created virtual table.

13. The elevator according to claim 9, further comprising:

the elevator-specific application, and the database external to the database language re-issue device.

* * * * *